United States Patent [19]

Van Egmond et al.

[11] 4,398,298
[45] Aug. 9, 1983

[54] COMMUNICATION SYSTEM HAVING STATIONS CAPABLE OF DETECTING ANOTHER STATION'S SIMULTANEOUS INITIATION OF TRANSMISSION

[75] Inventors: Johannes A. M. Van Egmond; Johannes Klein; Engbert Tienkamp, all of Breda, Netherlands

[73] Assignee: U.S. Philips Corporation, New York, N.Y.

[21] Appl. No.: 304,396

[22] Filed: Sep. 21, 1981

[30] Foreign Application Priority Data

Oct. 2, 1980 [NL] Netherlands .......................... 8005458

[51] Int. Cl.³ .............................................. H04B 3/50
[52] U.S. Cl. .......................................... 375/7; 375/36; 370/85
[58] Field of Search ............................... 375/7, 8, 9, 36; 370/24, 32, 85, 31, 51, 52, 57; 179/2 C, 2 DP; 178/45; 340/825.50, 825.51; 455/58

[56] References Cited

U.S. PATENT DOCUMENTS

| | | | |
|---|---|---|---|
| 4,084,069 | 4/1978 | Looschen | 375/36 |
| 4,086,534 | 4/1978 | Olson | 375/7 |
| 4,205,360 | 5/1980 | Drucker | 375/7 |
| 4,254,501 | 3/1981 | Griffith et al. | 375/36 |
| 4,270,214 | 5/1981 | Davis et al. | 375/36 |

Primary Examiner—Benedict V. Safourek
Assistant Examiner—Stephen Chin
Attorney, Agent, or Firm—Thomas A. Briody; William J. Streeter; Edward W. Goodman

[57] ABSTRACT

A communication system comprising a connecting line and stations connected thereto, each station having free access to the connecting line. In a station which requests or has access, a transmitting stage and a receiving stage are both connected to the line, the output impedance of the transmitting stage on the supply of a predetermined logic value being temporarily increased to at least the order of magnitude of the characteristic impedance of the line, and a detector which is coupled to an output of the receiving stage producing a detection signal which switches off the transmitting station when the receiving stage receives a value which differs from the predetermined logic value.

15 Claims, 6 Drawing Figures

COMMUNICATION SYSTEM HAVING STATIONS CAPABLE OF DETECTING ANOTHER STATION'S SIMULTANEOUS INITIATION OF TRANSMISSION

BACKGROUND OF THE INVENTION

The invention relates to a communication system having a connecting line and stations connected thereto for transmitting and receiving information, each station comprising a processor, a transmitting stage and a receiving stage, the processor in each station having free access to the connecting line via the transmitting stage, and each station including a detector for switching off the transmitting station upon detection of the presence of another station requesting and having, respectively, substantially simultaneous access to the connecting line, and to a station suitable therefor.

Such a communication system is described in the magazine "Electronics" dated June 5th, 1980, pages 89 and 90. The advantage of the use of free access is the absence of a central system controller which determines which station is authorized to transmit, as in the event of breakdown in the system controller, which is per se very expensive, the entire communication system may be put out of operation. When there is free access to the system, each station comprises a detector for detecting a station which had previously started transmitting or a station which starts transmitting more or less simultaneously. The above article describes that a station which requests access and detects a different transmitting station waits a predetermined period of time, which time period becomes longer on repeated trials. It is not described how the presence of the other transmitting station is detected. A station which had previously started transmitting may, for example, be detected by means of a carrier detector connected to the connecting line. The detection of another station which starts transmitting more or less simultaneously, that is to say in the same clock pulse period, creates more problems, as now both stations influence the information present on the connecting line, to which information combination in the region of the station, the information the station transmits itself will contribute most.

SUMMARY OF THE INVENTION

The invention has for its object to provide a communication system in which a detection, which is satisfactory for practical purposes, of stations which start transmitting in the same clock pulse period occurs. A communication system according to the invention is characterized in that at a station which requests or has access to the connecting line, in which station the transmitting stage and the receiving stage are both connected to the connecting line, the output impedance of the transmitting stage, whe it supplies a predetermined logic value, is temporarily increased by impedance increasing means to at least the order of magnitude of the characteristic impedance of the connecting line, the detector, which is coupled to an output of the receiving stage, producing a detection signal which switches off the transmitting station when, during the increase in impedance, the receiving stage receives a logic value which differs from the predetermined logic value.

The temporary increase of the impedance at the transmitting stage results in that the predetermined logic value, for example the logic 0, transmitted by the station itself acts on its own detector in more or less the same way as the other logic value, for example the logic 1, which is produced by a remote station and which is attenuated during its travel through the connecting line. Herein the logic 0 and 1 each correspond to a determined voltage which is applied by the transmitting stage to the connecting line. If the impedance of the transmitting stage were not increased, the logic 0 it transmitted itself would dominate in the signal combination present on the connecting line at the detector, so that the attenuated logic 1 would not be detected.

A simple embodiment of the transmitting stage, adapted to a specific construction of the connecting line results in a communication signal which is characterized in that the transmitting stage in the station comprises a transmitter amplifier of the type having two 3-state outputs, a signal input and a control input, a high and a low output impedance, respectively, of the transmitter amplifier being obtainable via this control input and at which low output impedance the two amplifier outputs carry the logic 1 and 0 respectively, depending on the signal applied to the signal input, the two amplifier outputs being connected to two wires of the connecting line which is in the form of a 2-wire line, and the signal input and the control input being coupled to the processor.

In order to achieve a direct coupling between the logic value to be produced by the transmitting stage and the output impedance increase associated or not associated therewith, the communication system is further characterized in that the processor is connected to the signal input via an encoder and the encoder is further connected to the control input of the transmitter amplifier via the impedance increasing means.

In order to achieve that in the high impedance state the outputs of the transmitter amplifier carry potentials which correspond to the predetermined logic value, the communication system is further characterized in that the outputs of the transmitter amplifier which are connected to the wires of the connecting line, are each connected in the station via a resistor to terminals of a voltage source which each carry a different potential.

A further embodiment of the communication system, in which the resistors are further employed for a more or less reflection-free connection of the station to the connecting line, is characterized in that the value of the parallel equivalent resistance of the resistors in the station, which are connected to wires of the connecting line, is of the order of magnitude of the characteristic impedance of the connecting line.

A still further embodiment in which the number of stations connected to the connecting line has been taken into consideration, is characterized in that the parallel equivalent resistance of the resistors in all the stations connected to the connecting line is substantially equal to the characteristic impedance of the connecting line.

In order to prevent impermissible transient phenomena from appearing at the outputs of the transmitter amplifier as a result of switching actions, the communication system is characterized in that the impedance increasing means produces the high output impedance of the transmitter amplifier at a moment which differs from the moment at which the encoder produces the predetermined logic value at the outputs of the transmitter amplifier.

A communication system with a simple construction of the impedance increasing means which is further not switched off during a permitted transmission, is characterized in that the impedance increasing means comprises a logic gate having a first and a second input, respectively, which are coupled directly and via a differentiating circuit, respectively, to an output of the encoder, the output of the gate being connected to the control input of the transmitter amplifier and via a resistor to ground.

A communication system comprising an impedance increasing means which can be directly switched on or off from the processor, is characterized in that the impedance increasing means comprises a first logic gate having inputs which are connected to an output of the encoder and to outputs of the processor for carrying clock pulse signals, the output of the first logic gate being connected to an input of a second logic gate, a further input of which is connected to an output of the processor for carrying a pulse-shaped gate on/off switching signal, the output of the second gate being connected to the control input of the transmitter amplifier and via a resistor to ground.

A communication system comprising a detector for producing a detection signal having a pulse duration which is independent of the actual detection period, is characterized in that the detector comprises a comparison circuit, inputs of which are connected to the transmitting stage and to the receiving stage, and a hold circuit which has an input connected to the output of the comparison circuit and an output connected to an input of the processor.

A communication system in which, after detection of a different station which started transmitting simultaneously, the transmitting stage is switched off in a simple way and is ready for renewed switch-on, is characterized in that a detection signal output of the detector is connected to an input of the processor which has an output for carrying a switching signal on detection, this processor output being coupled to the detector for carrying out a resetting operation and being coupled to the transmitting stage for carrying out the output impedance increase.

A communication system in which it can be detected as rapidly as possible whether a different station has simultaneously started transmission, is characterized in that the processors in the stations are arranged for producing a bit sequential code word on requesting access to the connecting line, it holding for the code words of the stations that the predetermined logic value always occurs in a different position in the code words.

A communication system in which the stations include clock pulse generators for producing clock pulse signals of the same frequency but, as the case may be, different phases, so that a simultaneous start of the transmission implies a simultaneous start in one clock pulse period, is further characterized in that the bit-sequential code word has a number of bits, which number is at least one higher than the number of stations connected to the connecting line, the first bit in the code words for all stations having a logic value which differs from the predetermined logic value.

A communication system in which the bit-sequential code word is used, or in which search for access is carried out during a determined period of time while the information to be transmitted is directly transmitted from the beginning onwards, is characterized in that an output of the processor is connected to an input of the detector and an input of the impedance increasing means in the transmitting stage, the processor output being intended to carry a pulse-shaped signal for, inhibiting the detector and switching off the impedance increasing means from the connecting line after access has been requested during a determined period of time without a detection signal being produced, which results in a low output impedance of the transmitting stage.

A communication system comprising an easily switchable impedance increasing means having the first and second logic gates, is characterized in that the first and second logic gates, respectively, are in the form of an AND-gate and a NAND-gate, respectively.

DESCRIPTION OF THE DRAWINGS

The invention will now be further described with reference to the accompanying drawings, in which.

DESCRIPTION OF THE PREFERRED EMBODIMENT

Figure 1:
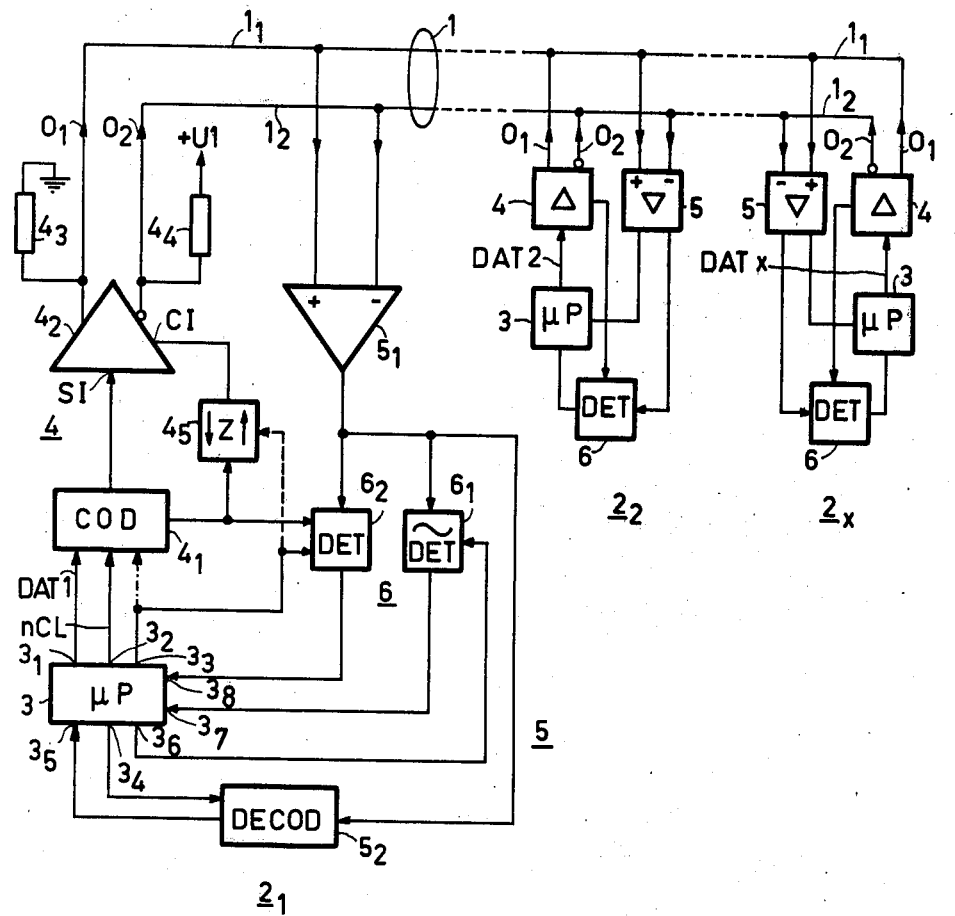
FIG. 1 shows a block schematic circuit diagram of a communication system and of the stations according to the invention.

In the communication systems shown in FIG. 1, reference numeral 1 denotes a connecting line to which a number of stations $2_1, 2_2, \ldots 2_x$ are connected. The connecting line 1 is in the form of a 2-wire line having two parallel wires $1_1$ and $1_2$. The station $2_1$ is connected to one end of the wires $1_1$ and $1_2$ and the station $2_x$ is connected to the other end. The connecting line 1 has, for example, a length of half a kilometer or more, the stations 2 comprising, for example, television cameras and/or control and signal processing units, respectively. The communication system may be present in a television studio, between television studios or between a control unit and remote cameras. By way of example, it holds that three to four ($=X$) stations 2 are connected to a connecting line 1, this line having a length of half a kilometer and a characteristic impedance equal to approximately 120 Ohms.

Each station 2 includes a processor 3 ($\mu$P) which, inter alia, applies information to be transmitted to a transmitting stage 4 having two outputs $0_1$ and $0_2$, which are connected to the respective wires $1_1$ and $1_2$. The output $0_2$ is an inverse output, a logic 1 at the output $0_1$ being associated with a logic 0 at the output $0_2$ and vice versa. By way of example it holds that a logic $0^2$ and 1, respectively, correspond to a potential smaller than or equal to 0.5 V and larger than or equal to 2.5 V, respectively, at the outputs $0_1$ and $0_2$.

Each station 2 further comprises a receiving stage 5, a (+) and a (−) input of which are connected to the wires $1_1$ and $1_2$. A multiple output/input of the receiving stage 5 is connected to a multiple input/output of the processor 3. In addition, a receiving stage output is connected to an input of a detector 6 (DET), to another input of which the transmitting stage 4 is connected. An output and input, respectively, of the detector 6 is connected to an input and output, respectively, of the processor 3.

FIG. 1 shows the station $2_1$ in greater detail, the multiple inputs and outputs being shown separately. An output terminal $3_1$ of the processor 3 carries the data DAT1 to be transmitted, which are applied to an encoder $4_1$ (COD) included in the transmitting stage 4. The encoder $4_1$ is further connected to, a processor multiple output terminal $3_2$ carrying clock pulse signals nCL, wherein nCL is equal to 1, 2, 4 or 8 times a clock pulse frequency CL, the respective clock pulse signals occurring at the terminals $3_{21}$, $3_{22}$, $3_{23}$ and $3_{24}$ shown in FIGS. 2 and/or 4. A processor output terminal $3_3$ may also be connected to the encoder $4_1$ (shown by means of the dot and dash line in FIG. 1), as is the case in accordance with the circuit diagram shown in FIG. 2.

The encoder $4_1$ is connected by means of an output to a signal input SI of a transmitter amplifier $4_2$ included in the transmitting stage 4. The amplifier outputs correspond with the outputs $0_1$ and $0_2$ of the transmitting stage 4, these outputs being connected via resistors $4_3$ and $4_4$, respectively, to a terminal which carries ground potential and a terminal which carries a potential $+U1$, respectively, these terminals forming part of a voltage source U1, not shown. In addition, the transmitter amplifier $4_2$ has a control input CI to which an encoder output is connected via impedance increasing means $4_5(Z)$. A further input of the impedance increasing means $4_5$ may be connected (see the broken line in FIG. 1) to the processor output terminal $3_3$, as is the case illustrated by the circuit diagram of FIG. 4.

The transmitter amplifier $4_2$ is of a type having two 3-stage outputs, a high and low output impedance (Z) being obtainable via the control input CI, the two outputs $0_1$ and $0_2$ carrying at the low output impedance the logic 1 and 0, respectively, or 0 and 1, respectively, depending on the signal supply of the logic 1 or 0 to the signal input SI. The transmitter amplifier $4_2$ is, for example, the Motorola amplifier MC 3487. For a given transmitter amplifier construction wherein $U1 = 5$ V a logic 0 and 1, respectively, at an amplifier output, in the low impedance state in which a minimum of $+3$ V is present of not more than $+0.5$ V at 48 mA and to a potential of not less than $+2.5$ V at $-20$ mA, respectively. In the high impedance state in which the O V ground potential is present on the control input CI, the amplifier outputs carry a leakage current of only approximately 100 $\mu$A, independent of the voltage applied to the signal input SI.

The resistors $4_3$ and $4_4$ have a dual function. On the one hand they ensure that in the high output impedance state of the transmitter amplifier $4_2$, the potentials at the outputs $0_1$ and $0_2$ correspond with the signal supply of a logic 0 to the amplifier $4_2$, that is to say the potential is less than 0.5 V at the output $0_1$ and over 2.5 V at the output $0_2$. On the other hand, the values of the resistors $4_3$ and $4_4$ have been chosen so that a substantially reflection-free transport of data over the connecting line 1 occurs. Choosing a value over 330 Ohms results in a parallel equivalent resistance value of 165 Ohms which is in the order of magnitude of the characteristic impedance of 120 Ohms of the connecting line 1. When, for example, four $(=X)$ stations 2 are connected to the connecting line 1, it appears that when the above-mentioned value is chosen for the resistors, a reflection-free data transport is properly approached in practice as then the parallel equivalent resistance of all the resistors $4_3$ and $4_4$ together is substantially equal to the characteristic impedance of the connecting line 1.

FIG. 1 shows that in the station $2_1$ the wires $1_1$ and $1_2$ are connected to a (+) and a (−) input of a receiver amplifier $5_1$. The output of the receiver amplifier $5_1$ is connected to an input of a decoder $5_2$ (DECOD), a further input and an output of which are connected to an output terminal $3_4$ and to an input terminal $3_5$, respectively, of the processor 3. The receiver amplifier $5_1$, which is in the form of a differential amplifier, and the decoder $5_2$ are assumed to form part of the receiving stage 5.

In addition, the output of the receiver amplifier $5_1$ is connected to an input of a carrier detector $6_1$ and an input of what is commonly referred to as a collision detector $6_2$ which together form the detector 6 (DET). A further input of the carrier detector $6_1$ is connected to a processor output terminal $3_6$, the detector $6_1$ output being connected to a processor input terminal $3_7$. Further inputs of the detector $6_2$ are connected to the output of the encoder $4_1$, which is further connected to the impedance increasing means $4_5$, and to the processor output terminal $3_3$, respectively. The output of the detector $6_2$ is connected to a processor input terminal $3_8$.

The following explains the operation of the station $2_1$ when it wants to start transmitting. The processor 3 produces as at the output terminal $3_6$ an actuation signal for the carrier detector $6_1$. Thereafter, carrier detector $6_1$ applies a signal to the processor input terminal $3_7$, indicating whether a signal has or has not been detected at the output of the amplifier $5_1$. If a signal is detected, the processor 3 waits a determined amount of time before a carrier detection is carried out again. If no carrier signal is detected, which signifies that none of the other stations $2_2$ through $2_x$ is transmitting, the processor 3 supplies signals at the output terminals $3_1$, $3_2$ and $3_3$. In response thereto the transmitting stage 4 in the station $2_1$ is put into operation and transmits a data stream (DAT1) of logic ones and zeros in a way which will be further described with reference to the further Figures. This data stream of logic ones and zeros is received by its own receiver amplifier $5_1$. In the detector $6_2$ the data stream received by the amplifier $5_1$ is compared with the transmitted data stream coming from the encoder $4_1$. Without further measures, another station 2, for example the station $2_2$, which may have started transmitting more or less simultaneously and which transmits the data DAT2 would hardly affect the output signal of the receiver amplifier $5_1$, the reason being that the data DAT2 arrives attenuated by the connecting line 1, while the received, own data stream DAT1 has not been attenuated. According to the invention, when now transmitting stage 4 in the station $2_1$ transmits a predetermined logic value, for example the logic 0, the impedance increasing means $4_5$ are put into operation, causing the output impedance of the transmitting stage 4 to be increased to such an extent, that is to say to at least the order of magnitude of the characteristic impedance of the connecting line 1, that its own transmitted data stream is attenuated to the same extent as the data transmitted by the other station $2_2$. This enables detection by the detector $6_2$ of a logic 1 which was simultaneously transmitted by the other station $2_2$, whereafter the transmitting stage 4 of the station $2_1$ is switched off by the signal at the processor output terminal $3_3$.

When the station $2_1$ requests access to the connecting line 1, after carrier detector $6_1$ has released the processor 3 for this purpose, the following possibilities may be considered.

For as rapid a detection as possible of another station which simultaneously started transmitting, thoughts might go to having each station 2 transmit its own bit-sequential code word when access to the connecting line 1 is requested. When, for example, four stations are connected, these code words may, for example, be assigned as follows: 1110, 1101, 1011 and 0111, the amplifier output impedance being temporarily increased at the time its own logic 0 is transmitted. It is assumed that the clock pulse signal CL, being the carrier, has the same frequency and phase in the several stations 2. In the event that the clock pulse frequency is the same but the phase is not the same, a simultaneous start means that this is comprised within one clock pulse period. Consequently, the first clock pulse period cannot be utilized for the detection. Thoughts may go towards a code word whose number of bits exceeds the number of stations 2 by at least one. In the above-mentioned example of four stations 2 this results in the code words: 11110, 11101, 11011 and 10111.

A further possibility is to refrain from transmitting a predetermined code word and to start directly the transmission of data intended for another station. As long as no logic one is detected during the transmission of the own logic zeros, in the increased impedance state, this is an indication that no other station is transmitting. The chance that the other station continuously transmits a logic 0 during a certain period of time when the own logic 0 is transmitted, has become so small after some time that the detector $6_2$ and the impedance increasing means $4_5$ may be switched off. The detector $6_2$ may be switched off, after, for example, a dozen data bits.

Figure 4:
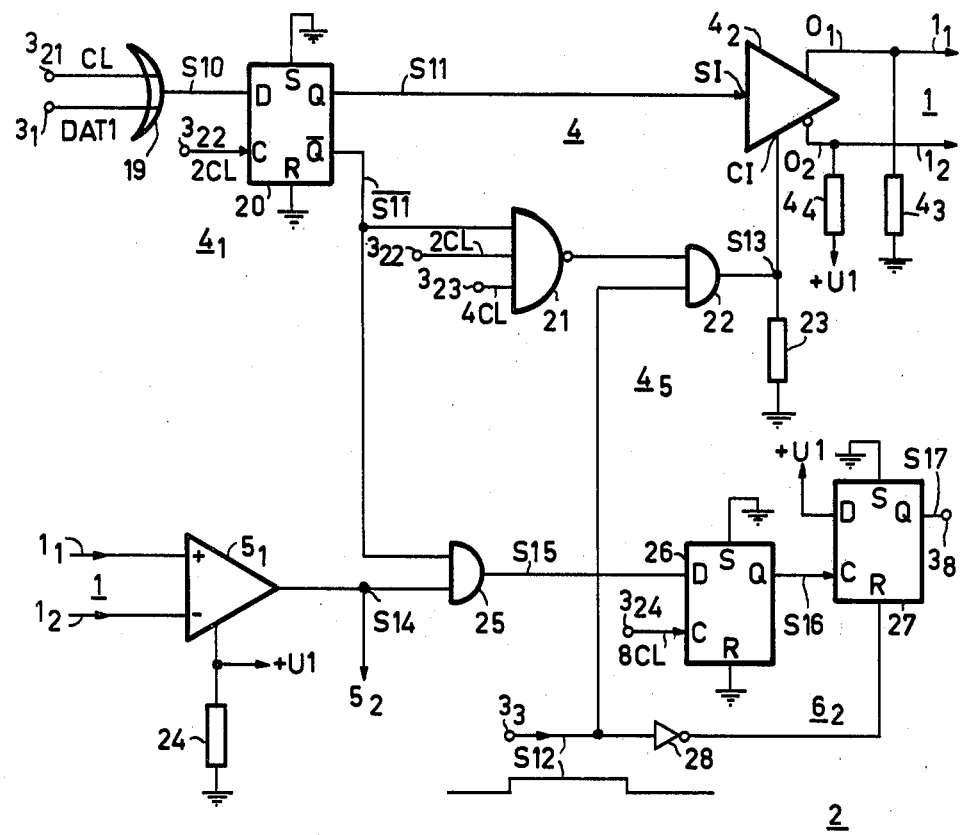
FIG. 4 shows a second circuit diagram.
Figure 6:
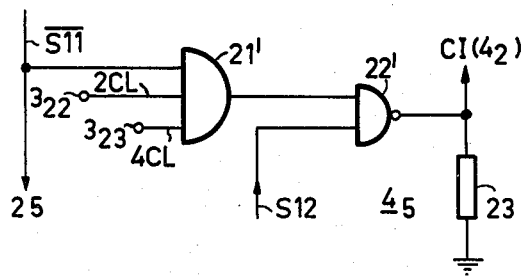
FIG. 6 shows a modification of FIG. 4.

For the realization of a switch-off of the detector $6_2$ and the impedance increasing means $4_5$, the encoder $4_1$ and the transmitter amplifier $4_2$ remaining in operation, FIG. 6 shows a modification of the circuit diagram of FIG. 4, which possibility will now be further described.

Figure 2:
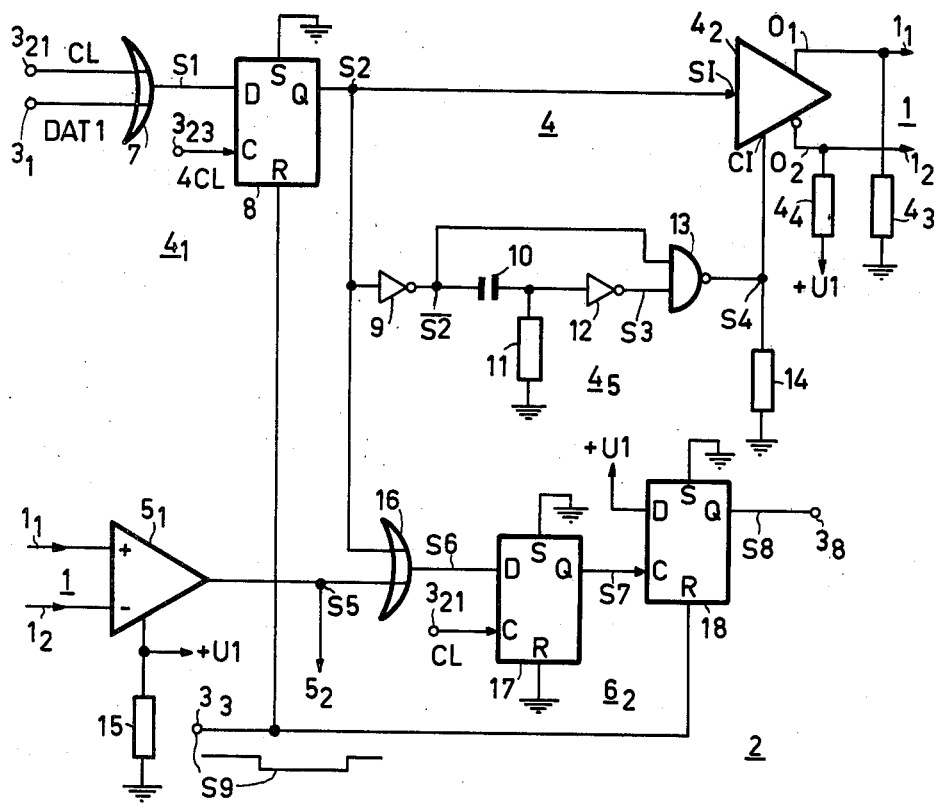
FIG. 2 shows a first detailed circuit diagram of a portion of a station in accordance with the invention.

When the communication system is comparatively insensitive to external interferences, the detector switch-off feature may be completely omitted. In the communication system shown in FIG. 4, in the construction with the 2-wire line, the external interferences will act to an equal extent on the two wires $1_1$ and $1_2$ and will not affect the output signal of the receiver amplifier $5_1$ which is in the form of a differential amplifier. The construction of a portion of a station $2_1$ shown in FIGS. 2 and 4 is suitable for use in a communication system in which, transmission having been permitted, no additional switch-off of the detector $6_2$ and the impedance increasing means $4_5$ takes place. In order to increase the certainty that an occasional interference does not result in switch-off of the transmitting stage 4, thoughts might go towards a switch-off only after a positive detection which has been repeated a few times.

Figure 3:
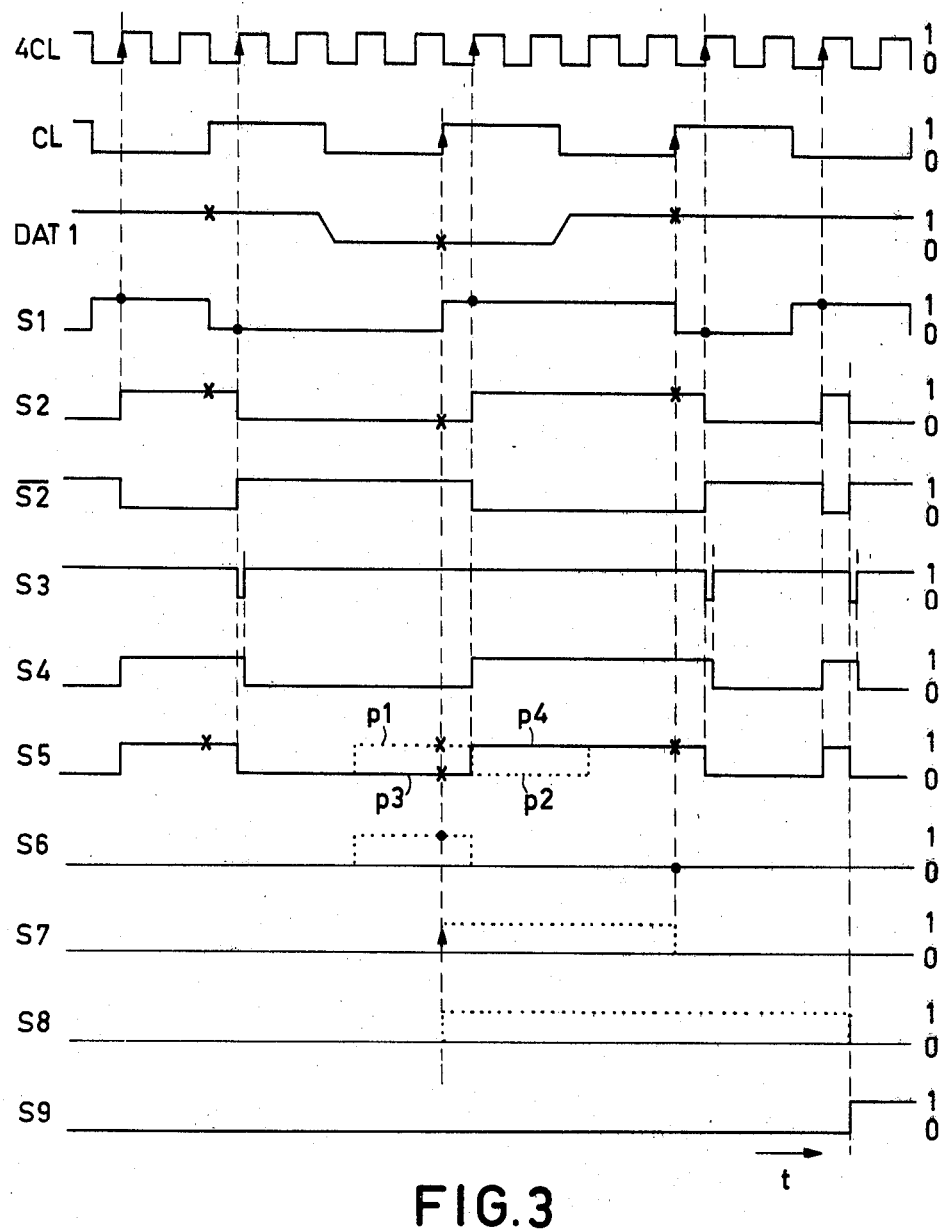
FIG. 3 shows signal variations, as a function of the time, of signals present in the circuit diagram of FIG. 2.

In FIG. 2, components shown in FIG. 1 are given the same reference numerals. The multiple processor output terminal $3_2$ of FIG. 2 carrying the signal nCL, is denoted in FIG. 2 as output terminals $3_{21}$ and $3_{23}$, at which terminals the clock pulse signal CL and 4CL, respectively, are produced. FIG. 3 shows the clock pulse signals 4CL and CL as a function of the time t. The data DAT1 are also plotted, data with the bits 101 being indicated by means of crosses, this data being preceded and followed by a logic 1. S1 to S9 represent further signals produced in the circuit of FIG. 2.

In FIG. 2, the terminal $3_1$ carrying the data DAT1 and the terminal $3_{21}$ carrying the clock pulse signal CL are connected to inputs of an exclusive OR-gate 7. The output of the gate 7 carries the signal S1 shown in FIG. 3, a logic 1 being produced in said signal only when the combination of a logic 0 and logic 1 is present at the gate inputs. The output of the gate 7 is connected to a preparatory input D of a D-type flip-flop 8. A clock pulse input C of the flip-flop 8 is connected to the terminal $3_{23}$ at which the clock pulse signal 4CL is produced. A setting input S of the flip-flop 8 is connected to ground (the logic 0) and a resetting input R is connected to the terminal $3_3$. The signal S9 shown in FIGS. 2 and 3 is produced at the terminal $3_3$. For the D-flip-flop 8, which has a Q-output, it holds that in the presence of the logic 0 (ground potential) at the S and R inputs a positive-going pulse edge at the C-input results in that the Q-output starts carrying the logic 0 or logic 1 present at the D-input, provided it was not already there. The application of the logic 1 to the R-input inhibits, in a dominant way, the flip-flop 8, the Q-output carrying the logic 0, independent of the signal supplies to the C and D-inputs. The signal S2 on the Q-output of the flip-flop 8 is plotted in FIG. 3. During the presence of the logic 0 in the signal S9, the pulse edges, provided with arrow tips, in the signal 4CL cause the flip-flop 8 to change state. In response thereto, the signal S2 at the Q-output follows the signal S1, provided with dots, present at the D-input. If the logic 1 appears in the signal S9, the logic 0 is produced dominantly in the signal S2.

The gate 7 and the flip-flop 8 form the encoder 4, which applies the signal S2 as the coded output signal to the signal input SI of the transmitter amplifier $4_2$. FIG. 3 shows that a logic 1 and logic 0, respectively, in the data DAT1 correspond with the code 10 and 01, respectively, in the signal S2. For the 101 information DAT1, indicated by means of crosses, there follows the code 100110 in the signal S2. As a result of this coding, the average voltage on the wires $1_1$ and $1_2$ of the connecting line 1 is equal to zero, independent of the content of the information DAT1.

In FIG. 2 the Q-output of the flip-flop 8 is connected to the input of an inverter 9. The output of the inverter 9 which carries the signal $\overline{S2}$ of FIG. 3 is connected to ground via a capacitor 10 in series wit a resistor 11. The junction of the capacitor 10 and the resistor 11 is connected via an inverter 12 to an input of a NAND-gate 13, a further input of which is connected to the output of the inverter 9. The output of the gate 13 is connected to the control input CI of the transmitter amplifier $4_2$, and to ground via a resistor 14.

The capacitor 10 and the resistor 11 form a differentiating circuit (10, 11), causing the output of the inverter 12 to carry the signal S3 of FIG. 3. In response to the signals $\overline{S2}$ and S3 applied thereto, the gate 13 produces the signal S4, shown in FIG. 3, as herein the logic 0 occurs only when the logic 1 is present in both signals $\overline{S2}$ and S3. In the construction described of the transmitter amplifier $4_2$, the presence of the logic 0 in the signal S4 causes this amplifier to be in the high impedance state.

FIG. 2 shows that the receiver amplifier $5_1$ produces the signal $S_5$. The amplifier $5_1$ is, for example, in the form of Motorola amplifier MC 3486, a control input of which is directly connected to a terminal carrying potential $+U1$, and to ground via a resistor 15.

In the event the station 2 of FIG. 2 does not transmit itself but receives, from another station, information which is only intended for this station, the decoder $5_2$ which is shown in FIG. 1 and which follows after the receiver amplifier $5_1$ is actuated by the processor 3. The reception starts with, for example, one or more starting bits followed by an address code word and the bit information intended for the address station. Decoding in the decoder $5_2$ may, for example, be carried out by means of an exlusive OR-gate. The application to this gate of a clock pulse signal 010101 and an incoming data stream 101010 results in the output signal 111111, which corresponds to the information DAT=111 to be transmitted and to be received. In a similar, way an incoming data stream 100110 results in the gate output signal 110011, which corresponds with the information DAT=101 to be transmitted/received.

When the station 2 of FIG. 2 transmits itself, the application of the signal S5 to the decoder $5_2$ is irrelevant, as the decoder $5_2$ may be in the switched-off condition. If only the transmitter amplifier $4_2$ of FIG. 2 applies signals to the wires $1_1$ and $1_2$ of the connecting line 1, the output signal S5 of the receiver amplifier $5_1$ will be substantially identical to the signal S2. The signal variation of the signal S5 for this situation is shown in FIG. 3 by means of solid lines. Crosses indicate the received information 101 which corresponds to the code 100110.

Let it now be assumed that it is not the only station transmitting, but that also a different station 2 applies information to the connecting line 1, the information being, for example, 111, which on reception corresponds with the code 101010. This code is plotted at the signal S5 of FIG. 3, namely by means of dotted lines for the central logic 1 in the information (p1 and p2). If the impedance at the transmitter amplifier $4_2$ is not increased, the self transmitted 01-code (p3 and p4) for the central logic 0 in the information 101 will dominate in the signal S5. In contradistinction therewith, when the impedance is increased the logic value transmitted by the other station 2 will then dominate. In the example shown in FIG. 3, this implies that at the increase in impedance, which is effected by means of the signal S4 with the logic 0, the dotted pulse value p1 is present in the signal S5. This results in a signal variation p1, p4 instead of a signal variation p3, p4 in the signal S5.

In FIG. 2 the signals S2 and S5 are applied to inputs of an exclusive OR-gate 16. The output of the gate 16, which carries the signal S6, is connected to the D-input of a flip-flop 17. The gate 16 produces, in the signal S6 of FIG. 3, a logic 1 only if a combination of logic 0 and 1 is present at the inputs, which for the signal variation p1, p4, results in the dotted pulse in the signal S6. As the terminal $3_{21}$, which carries the clock pulse signal CL, has been connected to the C-input of the flip-flop 17, the S and R inputs being connected to ground, the Q-output will carry the signal S7 shown in FIG. 3. The detection of the other transmitting station 2 results in the pulse, shown by means of a dotted line, in the signal S7 with a detection period equal to a clock pulse period. The gate 16 and the flip-flop 17 operrate together as a comparison circuit (16, 17).

The Q-output of the flip-flop 17 is connected to the C-input of a D-flip-flop 18. The S-input of the flip-flop 18 is connected to ground and the D-input is connected to a terminal which carries the potential +U1 (logic 1). The R-input of the flip-flop 18 is connected to the terminal $3_3$ at which the signal S9 is produced. The Q-output of the flip-flop 18 is connected to the terminal $3_8$ and carries the signal S8, shown in FIG. 3. The signal S8 is the detection signal from the detector $6_2$, in which, on detection of another transmitting station 2 the pulse is produced which is shown by means of a dotted line. The flip-flop 18 then operates as a hold circuit, the change in state of the flip-flop 18 only occurring when the logic 1 in the signal S9 is produced at the resetting input R.

In the embodiment of the station 2 described with reference to FIG. 2, the logic 1, shown by means of a dotted line, in the signal S8, which is applied to the input terminal $3_8$ of the processor 3 of FIG. 1, causes the processor 3 to produce the logic 1 in the signal S9 at the processor output terminal $3_3$. Then, the logic 0 occurs in a dominant way in the signal S2 coming from the flip-flop 8 in the encoder $4_1$ and in the signal S8 coming from the flip-flop 18 in the detector $6_2$. The gate 13 then has the logic 1 on both inputs so that the output thereof, carrying the signal S4, carries the logic 0 (ground potential). As a result of the resultant high impedance state of the transmitter amplifier $4_2$, the transmitting stage 4 is disconnected from the connecting line 1.

It can be seen that the station 2 of FIG. 2 does not have a means to switch off the detector $6_2$ without the encoder $4_1$ being switched off. Consequently, during transmission by the station 2, the detector $6_2$ is continuously put into operation. This is permissible as, on the one hand, transmitting by the other stations 2 is prevented by their own carrier detector $6_1$ and, on the other hand, external interferences exercise a similar influence on the two wires $1_1$ and $1_2$ and consequently do not affect the output signal of the receiver amplifier $5_1$, which is in the form of a differential amplifier. When transmission stops, the processor 3 produces, at its own initiative, the logic 1 in the signal S9 at the processor output terminal $3_3$.

In the embodiment of the station 2 as shown in FIG. 4, the terminal $3_1$ and $3_{21}$, which carry the information DAT1 and the clock pulse signal CL, respectively, are coupled to the D-input of a flip-flop 20 via an exclusive OR-gate 19. In the manner described for FIG. 3, the D-input carries a signal S10, the signal variation of which is plotted in FIG. 5 which further shows the signals S11 through S17. The S and R inputs of the flip-flop 20 are connected to ground and the C-input is connected to the terminal $3_{22}$ which carries the clock pulse signal 2CL. The Q-output and the inverse $\overline{Q}$-output of the flip-flop 20 carry the signals S11 and $\overline{S11}$, respectively. The gate 19 and flip-flop 20, which constitute the encoder $4_1$, apply the signal S11 to the signal input SI of the transmitter amplifier $4_2$. The signal $\overline{S11}$ is applied to an input of a NAND-gate 21, further inputs of which are connected to the terminals $3_{22}$ and $3_{23}$ on which the respective clock pulse signals 2CL and 4CL are present. The output of the gate 21 is connected to an input of an AND-gate 22, another input of which is connected to the terminal $3_3$ which carries the signal S12, shown next to it. The output of the gate 22 is directly connected to the control input CI of the transmitter amplifier $4_2$, and to ground via a resistor 23. The output of the gate 22 carries the signal S13, shown in FIG. 5, in which, the logic 1 being present in the signal S12, the logic 0 occurs only if the logic 1 is simultaneously present in the signals $\overline{S11}$, 2CL and 4CL. If the logic 0 is present in the signal S12, the logic 0 occurs in the signal S13 and the transmitting stage 4 is switched off.

Figure 5:
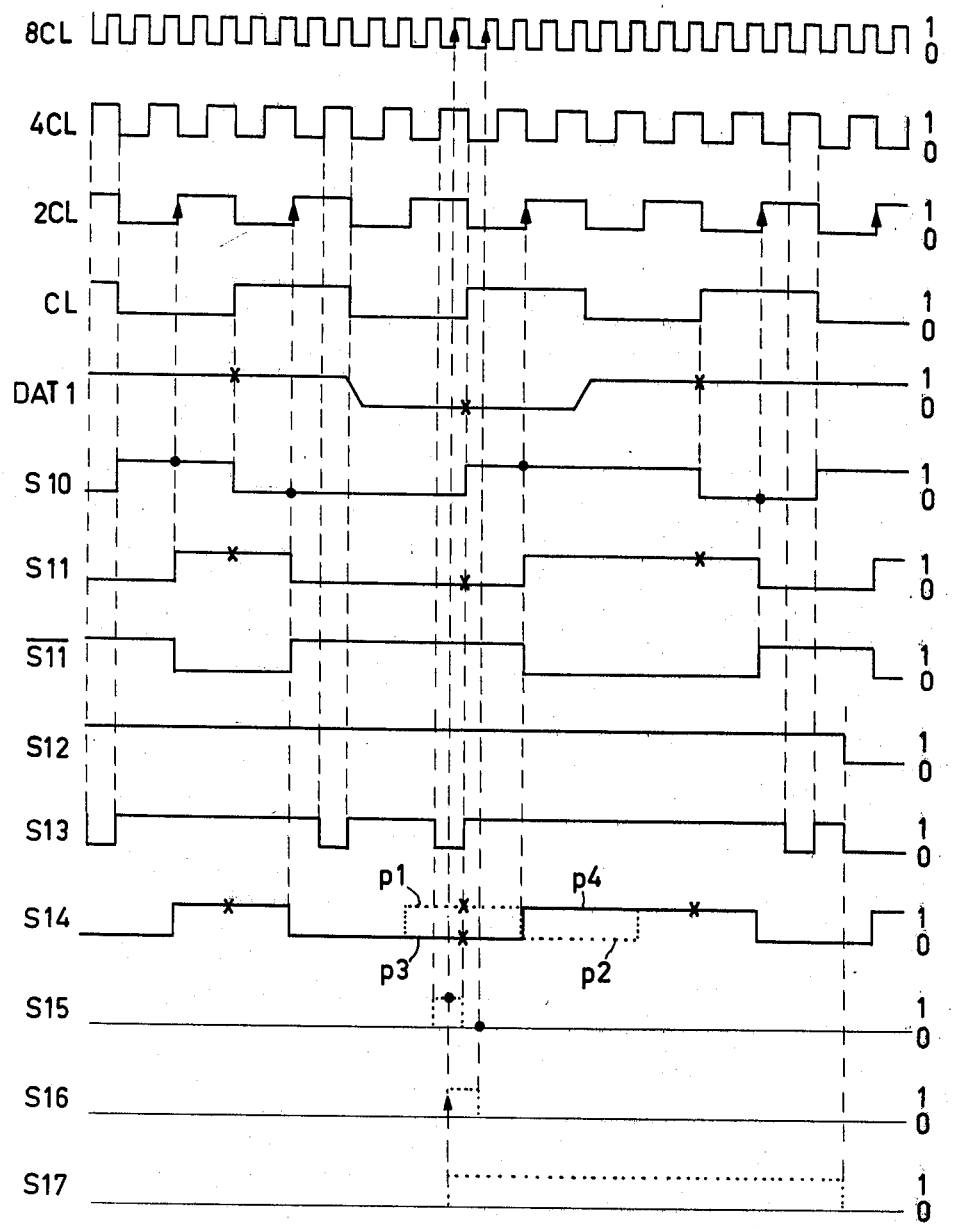
FIG. 5 shows associated signal variations.

The receiver amplifier $5_1$ of FIG. 4 carries at its output the signal S14, a control input being directly connected to a terminal carrying a potential +U1, and to ground via a resistor 24. In the manner described wit reference to FIG. 3 for the signal S5, the signal variation of the signal S14 of FIG. 5 is shown by means of solid lines (code 01; p3, p4) and by means of dotted lines (code 10; p1, p2). The signal S14 is applied to an input of an AND-gate 25, to a further input of which the signal $\overline{S11}$ is applied. In the manner described with reference to FIG. 3 for signal S6, it follows that the output of the gate 25 carries the signal S15, having a pulse shown by means of a dotted line, when the logic 0, which increases the impedance, is present in the signal S13 and a further transmitting station 2 produces the pulse value p1 shown by means of a dotted line.

The output of the gate 25 is connected to the D-input of a flip-flop 26, the S and R inputs of which are connected to ground. The C-input of the flip-flop 26 is connected to the terminal $3_{24}$ at which the clock pulse signal 8CL is present. As a result thereof, the Q-output of the flip-flop 26 carries the signal S16 of FIG. 5, which has the pulse, shown by means of a dotted line, as a brief detection pulse. The gate 25 and the flip-flop 26 form a comparison circuit (25, 26).

The Q-output of the flip-flop 26 is connected to a C-input of the flip-flop 27. The flip-flop 27 has its S-input connected to ground and the D-input connected to a terminal carrying the potential +U1 (logic 1). The R-input of the flip-flop 27 is connected via an inverter 28 to the terminal $3_3$ at which the signal S12 is produced. The Q-output of the flip-flop 27 applies the detection signal S17 to the terminal $3_8$. The flip-flop 27 operates as a hold circuit in the detector $6_2$.

From the signals S4 and S5 (S2) of FIG. 3 and the signals S13 and S14 (S11) of FIG. 5, it can be seen that the moment of impedance increase, which corresponds to the transition of the logic 1 to the logic 0 in the signals S4 and S13, does not coincide with the occurrence of a pulse edge in the signal S2 or S11 to be transmitted. In this way an impermissible combination of transient phenomena is prevented from occurring, this combination being particularly caused by an inductive-capacitive loading phenomenon at the connecting line 1.

In the embodiment of the station 2 shown in FIG. 4, the logic 0 in the signal S12 results in that, on the one hand, the detector $6_2$ and that, on the other hand the transmitter amplifier $4_2$ are switched off. The transmitter amplifier $4_2$ then is in the high impedance state. FIG. 6 shows a modification of FIG. 4 in which the NAND-gate 21 and the AND-gate 22 are replaced by an AND-gate 21' and a NAND-gate 22'. At the occurrence of logic 1 in the signal S12, the gate 22' produces, in unchanged manner, the signal variation shown in FIG. 5 for the signal S13. At the occurrence of the logic 0 in the signal S12, it has now, however, been achieved that the detector $6_2$ is disconnected and the gate 22' applies the logic 1 to the control input CI of the transmitter amplifier $4_2$. The impedance increasing means $4_5$ is then in the switched-off state. This makes it possible to employ the signal S12 for requesting, for a predetermined period of time, access to the connecting line 1, whereafter, when the dotted detection signal in the signal S17 does not occur, detector $6_2$ is inhibited and the impedance increasing means $4_5$ is switched off, so that the transmitter amplifier $4_2$, with the low output impedance, can continue transmission. For completeness' sake it should be noted that at the termination of the transmission, the processor 3 must adjust the transmitter amplifier $4_2$ to the high impedance state as otherwise the connecting line 1 is loaded by the low amplifier output impedance.

What is claimed is:

1. A communication system having a connecting line and stations connected thereto for transmitting and receiving information, each station comprising a processor, a transmitting stage and a receiving stage, the processor in each station having free access to the connecting line via the transmitting stage, and each station including a detector for switching off the transmitting station upon detection of the presence of another station requesting and having, respectively, substantially simultaneous access to the connecting line, characterized in that at a station which requests or has access to the connecting line in which station the transmitting stage and the receiving stage are both connected to the connecting line, an output impedance of the transmitting stage, when it supplies a predetermined logic value, is temporarily increased by impedance increasing means to at least the order of magnitude of the characteristic impedance of the connecting line, the detector, which is coupled to an output of the receiving stage, producing a detection signal which switches off the transmitting station when, during the increase in impedance, the receiving stage receives a logic value which is different from said predetermined logic value.

2. A communication system as claimed in claim 1, characterized in that the transmitting stage in the station comprises a transmitter amplifier of the type having two 3-state outputs, a signal input and a control input, a high and a low output impedance, respectively, of the amplifier being obtainable via this control input and at which low output impedance the two amplifier outputs carry the logic 1 and 0, respectively, depending on the signal applied to the signal input, the two amplifier outputs being connected to two wires of the connecting line, which is in the form of a 2-wire line, and the signal input and the control input being coupled to the processor.

3. A communication system as claimed in claim 2, characterized in that the processor is connected to the signal input via an encoder and the encoder is further connected to the control input of the transmitter amplifier via the impedance increasing means.

4. A communication system as claimed in claim 2 or claim 3, characterized in that the outputs of the transmitter amplifier which are connected to the wires of the connecting line, are each connected in the station via a resistor to terminals of a voltage source which each carry a different potential.

5. A communication system as claimed in claim 4, characterized in the the resistors in the station which are connected to the wires of the connecting line form a parallel equivalent resistance having a value which is of the order of magnitude of the characteristic impedance of the connecting line.

6. A communication system as claimed in claim 5, characterized in that the parallel equivalent resistance of the said resistors in all the stations connected to the connecting line is substantially equal to the characteristic impedance of the connecting line.

7. A communication system as claimed in claim 3, characterized in that the impedance increasing means produces the high output impedance of the transmitter amplifier at a moment which differs from the moment at which the encoder produces the said, predetermined logic value at the outputs of the transmitter amplifier.

8. A communication system as claimed in claim 3 or 7, characterized in thatt the impedance increasing means comprises a logic gate having a first and a second input, respectively, which is coupled directly and via a differentiating circuit, respectively, to an output of the encoder, the output of the gate being connected to the control input of the transmitter amplifier and via a resistor to ground.

9. A communication system as claimed in claim 3 or 7, characterized in that the impedance increasing means comprises a first logic gate having inputs which are connected to an output of the encoder and to outputs of the processor for carrying clock pulse signals, the output of the first gate being connected to an input of a second logic gate a further input of which is connected to an output of the processor for carrying a pulse-shaped gate on/off switching signal, the output of the second gate being connected to the control input of the transmitter amplifier and via a resistor to ground.

10. A communication system as claimed in claim 9, characterized in that the detector comprises a comparison circuit inputs of which are connected to the transmitting stage and to the receiving stage, and a hold circuit which has an input connected to the output of the comparison circuit and an output connected to an input of the processor.

11. A communication system as claimed in claim 9, characterized in that a detection signal output of the detector is connected to an input of the processor which has an output for carrying a switching signal on detection, this processor output being coupled to the detector for carrying out a resetting operation and being coupled to the transmitting stage for increasing the output impedance.

12. A communication system as claimed in claim 9, characterized in that the processors in the stations are arranged to produce a bit-sequential code word on requesting access to the connecting line the code words of the stations being such that the said, predetermined logic value always occurs in a different position in the code words.

13. A communication system as claimed in claim 12, characterized in that the bit-sequential code word has a number of bits which is at least one bit higher than the number of stations connected to the connecting line the first bit in the code words for all stations having a logic value which differs from the said predetermined logic value.

14. A communication system as claimed in claim 9, characterized in that an output of the processor is connected to an input of the detector and of the impedance increasing means in the transmitting stage, the processor output being intended to carry a pulse-shaped signal for inhibiting the detector and switching off the impedance increasing means after access to the connecting line has been requested during a determined period of time without a detection signal being produced, which results in a low output impedance of the transmitting stage.

15. A communication system as claimed in claim 9, characterized in that the said first and second logic gate, respectively, is in the form of an AND-gate and a NAND-gate, respectively.

* * * * *